Jan. 3, 1939. C. DUMELIN 2,142,558
CONCEALED HINGE FOR AUTOMOBILE DOORS
Filed Sept. 2, 1936   2 Sheets-Sheet 1
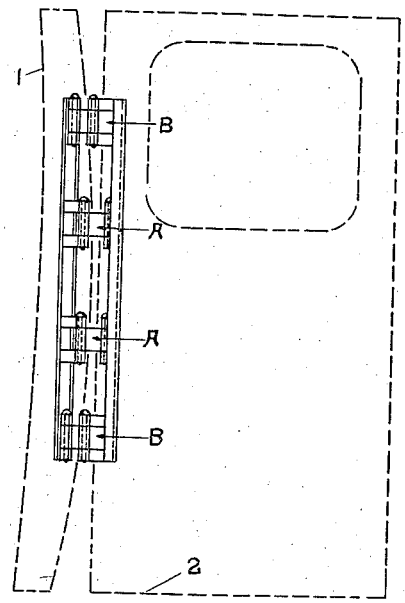
FIG.1
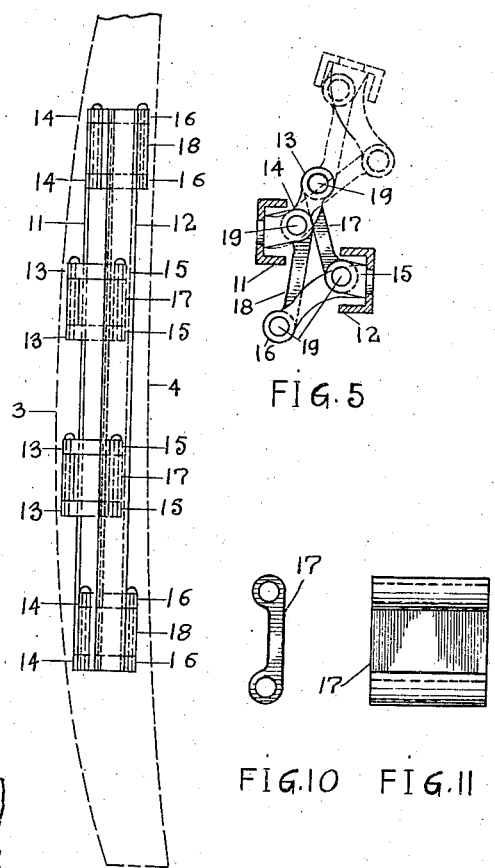
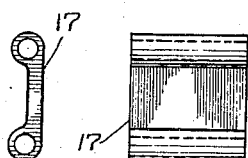
FIG.5
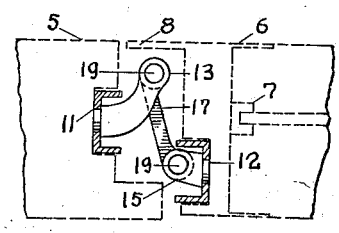
FIG.3
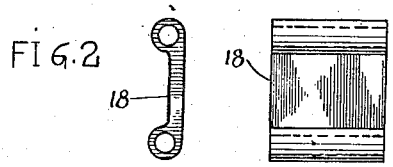
FIG.10   FIG.11
FIG.2
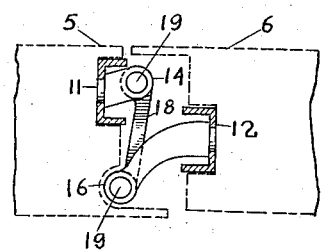
FIG.4
FIG.12   FIG.13
Charles Dumelin
INVENTOR.

Jan. 3, 1939. C. DUMELIN 2,142,558
CONCEALED HINGE FOR AUTOMOBILE DOORS
Filed Sept. 2, 1936 2 Sheets-Sheet 2
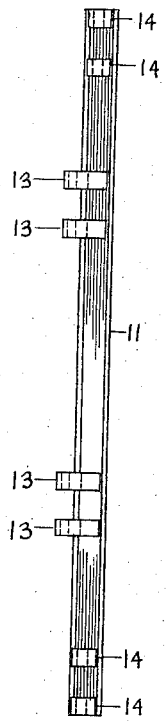
FIG. 6
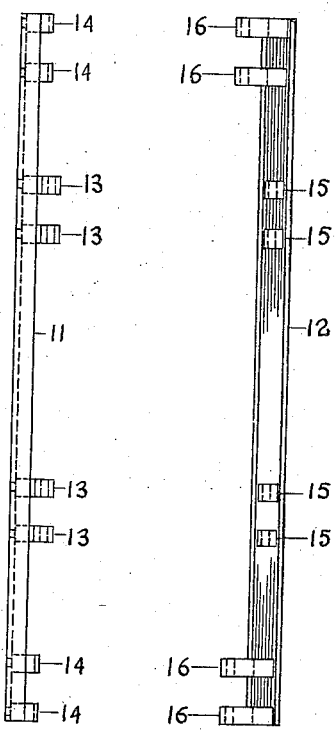
FIG. 7  FIG. 8
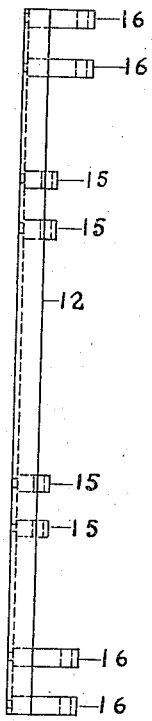
FIG. 9
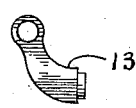
FIG. 14
FIG. 17
FIG. 18
FIG. 16
FIG. 15
Charles Dumelin
INVENTOR.

Patented Jan. 3, 1939

2,142,558

UNITED STATES PATENT OFFICE 2,142,558

CONCEALED HINGE FOR AUTOMOBILE DOORS

Charles Dumelin, Detroit, Mich.

Application September 2, 1936, Serial No. 99,120

4 Claims. (Cl. 16—164)

The primary object of my invention is to provide a concealed hinge particularly adapted for hinging automobile doors. It comprises two channels arranged to carry two elements of pivotal connections.

A further object of my invention is to provide two elongated channels adapted to close one over the other with the pivotal connections disposed within the space bounded by the outer edges of recesses formed on a pillar and door of an automobile body.

A further object being: The two channels are to be set in recesses of the pillar and door, each channel being provided with two separate alignments of bearings or knuckles and each alignment comprising two sets of bearings or knuckles which are axially alined. The axial alignment of these different sets of pivots gives the desired hinging movement obtained by a simple two link multiple-pintle hinge but in providing a plurality of spaced bearings and link elements I obtain a strong hinge with the elements so disposed transversely as to conform to curved body and door construction.

The invention is fully disclosed in this specification of which the accompanying drawings form a part, and in which the separate parts of my improvement are designated by suitable reference characters, in each of the views and in which:

Fig. 1 is a vertical sectional view of an automobile body pillar and side elevation of a door with the hinge attached to it. It comprises two channels with bearing portions welded thereon and two pairs of links designated by arrows A—A and B—B. Fig. 2 is a vertical sectional view of the body pillar with the hinge in its relative closed position. Fig. 3 is a plan view showing a link connection designated by arrows A—A of Fig. 1. Fig. 4 is a plan view showing a link connection designated by arrows B—B of Fig. 1. Fig. 5 is a plan view of the hinge, the dotted lines showing it in open position. Figs. 6 and 7 are elevation views of the stationary channel with four sets of bearing portions welded thereon. Figs. 8 and 9 are elevation views of the channel pivoting the door also with four sets of bearing portions welded thereon. Figs. 10 and 11 are plan views of an intermediate link. Figs. 12 and 13 are plan views of the top or bottom link. Figs. 14, 15, 16 and 17 are plan views of the bearing portions. Fig. 18 illustrates an elevation view of the bearing portion of Fig. 14. The above mentioned bearing portions are of substantially equal width.

In said drawings 1 denotes a body pillar and 2 the door, the body pillar in Fig. 2 shows a vertical outer body curve 3 and inside construction line 4. The hinge is shown in its relative closed position with bearings 13 and 14 axially offset and positioned longitudinally near the outer body line. 5 denotes part of the sheet metal of a body pillar, 6 is part of the sheet metal of the door, 7 designates the mounting of a glass runway and 8 is the outer door flange construction. The hinge as shown comprises two elongated channels 11 and 12 with bearing portions 13, 14, 15 and 16 welded thereon, a pair of intermediate links 17 and a second pair of top and bottom links 18 and pivot pins or pintles 19. The two channels are of approximately U shaped form and substantially equal width and in the construction shown channel 11 is mounted in connection with the body pillar and is provided with two sets of bearing portions 13 and another two sets of bearing portions 14. The channel 12 is mounted in connection with the door and is provided with two sets of bearing portions 15 and another two sets of bearing portions 16. As best shown in Figs. 6 and 7 bearing portions 13 and 14 form two alignments on channel 11; they are spaced longitudinally at given distances and disposed on axes offset from each other. In Figs. 8 and 9 bearing portions 15 and 16 are spaced longitudinally directly opposite those of channel 11; they also form two alignments disposed on axes offset from each other. Each set of bearing portions have upper and lower bearing portions spaced to receive link knuckles. Referring to Fig. 4 it will be seen that bearing portions 16 with the bearings formed thereon extend along body construction line 4 and seat in the recess of the pillar. Two pairs of links 17 and 18 pivoting about pintles 19 carried by the bearings 13, 14, 15 and 16 serve to connect the two channels 11 and 12 together to form the complete hinge structure. Links 18 are slightly longer between their points of pivotal connections, otherwise said links 17 and 18 are of equal width and strength and offer no interference to a close fitting or when swung to open position.

Further the structure of the hinge is such as to provide the two channels with rigidness longitudinally while supporting the door. It is well understood that all corresponding hinge axes must be in vertical alignment before a door can be swung to open position. From the above it can be seen I have provided an exceptionally efficient, strong, reasonably simple and inexpensive hinge for the purpose intended.

I claim:

1. A concealed hinge comprising two elongated channels adapted to be secured to an automobile body and door respectively, each of said channels having two axially alined sets of bearing portions secured thereto, one set on each channel being substantially enclosed therein and the other set on each channel being offset from the enclosed set, the offset bearing portions of one channel being disposed intermediate of the channel length and offset outwardly of the body and the offset bearing portions of the other channel being disposed above and below said intermediate set and offset inwardly of the body, and the vertically corresponding bearing portions joined by pairs of links.

2. A concealed hinge comprising two relatively long channels adapted to be secured to a curved automobile body and door respectively, one of said channels having an alined set of bearing portions secured at remote ends of the channel and the other channel having an alined set of bearing portions secured intermediate the end of the channel, the intermediate set being offset outwardly of the body and the remote set being offset inwardly of the body and links pivotally connected to said bearing portions and to said channels.

3. A hinge comprising two channels adapted to be secured to a body and door and with their open sides adjacent, one of said channels having an end set of bearing parts secured near the ends of the channel and the other channel having a set of bearing parts secured thereto longitudinally intermediate the bearing parts of said end set, the intermediate set being offset to the outer side of the body and the end set being offset to the inner side of the body and links journaled at one end on the offset bearing parts and at the other end on additional bearing parts on the channels.

4. A concealed hinge comprising two channels, each of said channels having sets of bearing parts secured thereto, one set on each channel being partly enclosed thereby and the other set on each channel being offset from the enclosed set, the offset bearing parts of one channel being disposed intermediate the channel length and offset toward the outer side of the body and the offset bearing parts of the other channel being disposed above and below said intermediate parts and offset inwardly of the body, and links joining the enclosed bearing parts with the offset bearing parts.

CHARLES DUMELIN.